Aug. 27, 1940.  O. THORESEN  2,212,889
SAFETY PIN
Filed Oct. 16, 1939
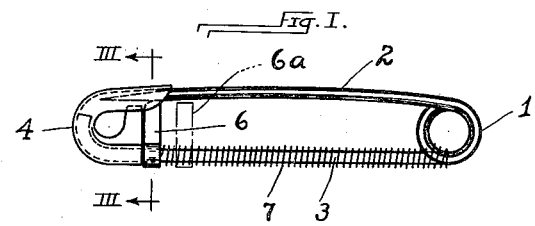
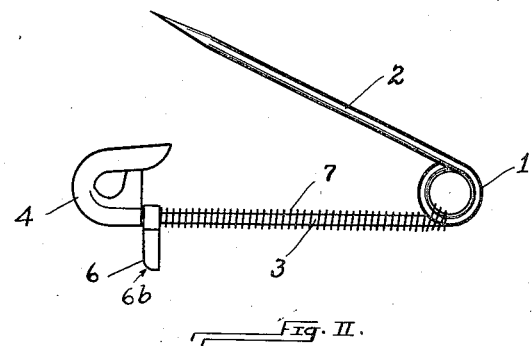
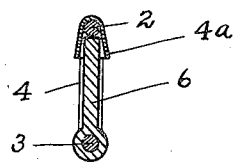
INVENTOR
Oscar Thoresen
by Christy and Wharton
his attorney Patented Aug. 27, 1940

2,212,889

UNITED STATES PATENT OFFICE 2,212,889

SAFETY PIN

Oscar Thoresen, Pittsburgh, Pa.

Application October 16, 1939, Serial No. 299,604

4 Claims. (Cl. 24—158)

My invention relates to fastening devices, particularly to safety pins, and more particularly to safety pins that include means for locking them in closed position. The invention consists in certain valuable improvements in the structure and organization of such locking means.

A safety pin embodying the invention is illustrated in the accompanying drawing, in which Figs. I and II are views of the pin in side elevation. In Fig. I the pin is shown locked in closed position, and in Fig. II it is shown unlocked and in open position. Fig. III is a view to larger scale and in cross section of the head of the pin, as seen on the plane III—III of Fig. I.

The fastening device in which, in exemplary way, the invention has been embodied, consists in the well-known safety pin, formed of a length of elastic wire, coiled, as at 1, and bent back upon itself, providing two shanks 2 and 3. The two shanks are relatively movable on the axis of the coil 1, between open position (Fig. II) and closed positon (Fig. I). The shank 2 is pointed at its distal end, while the shank 3 carries at its distal end a head or shield 4. The shield 4 is of usual form, constructed of sheet metal, and including a hood portion 4a of inverted V-shape in cross section. The hood portion is in known way adapted to receive and cover the pointed end of the shank 2. The invention lies in means, which, when the pin is closed, serve to lock the pointed end of the shank 2 within the shield.

Such means consist, advantageously, in a locking element 6 and a spring 7. The locking element is in effect a small arm or finger mounted, adjacent to one of its opposite ends, on the shank 3. The member 6 is movable both axially and angularly of such shank, between a position in which the pointed end of the pin is locked in the shield, and a position in which such end of the pin is released. In locking position the member 6, as shown in Figs. I and III, extends transversely between the shanks 2 and 3, with its otherwise free end nested in the hood portion 4a of the shield, in which position, manifestly, the pointed end of the shank 2 is locked within the shield 4. In releasing the lock, in order that the pin may be opened, the member 6 is shifted axially of the shank, into the position indicated by the broken lines 6a in Fig. I, and then, thus freed from engagement with the hood portion of the shield, it is rotated on the shank through 180°, and brought into the position illustrated in Fig. II. With the locking member in such position, the pin may be opened and closed at will.

The spring 7 is in this case an elongate helical spring which, mounted on the shank 3, is anchored at one end to the locking element, and at opposite end to the shank, in this case to the coiled end of the pin, as shown. It is important to note that the spring serves in triple capacity:

First: The spring serves normally to secure the locking member 6 in position of abutment upon the inner edge of the shield 4, both when the pin is locked (Fig. I) and when it is unlocked (Fig. II).

Second: The spring serves as means for manipulating the lock. Specifically, the coiled body of the spring, with the coils being arranged as they are in close succession, provides in effect a sleeve on the shank 3—a sleeve that, grasped between the thumb and forefinger of the user, may be pressed (with compression of the coils axially of the shank 3) towards the end 1 of the pin, thereby effecting the axial shifting of the locking member from its position of abutment upon the shield. With the locking member thus drawn (and held) away from the shield, rotative stress may be applied to the sleeve-like spring, and the locking member rotated on the shank 3, either to or from position (6a, Fig. I) before the open end of the hood 4a of the shield. That is to say, a combination of axial and rotative stresses may be applied to the spring, in such manner as to effect the movement of the locking member between locking and release positions.

Third: The spring 7, being a torsional spring as well as a compression spring, is adapted (when the pin is unlocked) to arrest, or yielding to retain, the locking member 6 in the release position in which it is shown in Fig. II, in which position it is out of the way, offering no interference to the ready opening and closing of the pin. When the locking member is in such release position, the torsional stress of the spring is zero. When, on the other hand, the locking member is rotated on the shank 3 from such position, the spring is torsionally energized, with the consequence that it tends to turn the locking member back into release position. When the locking member 6 has been rotated and shifted into locking position, the compressive stress of the spring operates to maintain the locking member against the edge of the shield 4, with the distal end of the locking member in position in the hood portion 4a of the shield. The hood portion 4a of the shield, in laterally confining the distal end of the locking member, prevents the torsional stress of the spring from turning the locking element from such position. Under both the torsional and the compressive stresses of the spring, the locking member is secured in pin-locking engagement with the shield 4. Another virtue may be noted of the torsional stress of the spring. Specifically, the torsional stress of the spring facilitates the unlocking of the pin; that is, in unlocking the pin it is merely necessary to withdraw the locking member from the hood portion of the shield: the spring does the rest—the spring automatically rotates the locking member to release position.

It remains to be noted that the distal end of the locking element is rounded, as shown at 6b, in Fig. II. This refinement in detail simplifies the locking and unlocking of the pin, in that it reduces the distance which the locking member must be axially shifted on the shank 3 in effecting such manipulation. Indeed, in locking the pin, it is merely necessary to rotate the locking member into a position in which its outer end bears against one or the other side edge of the hood portion 4a of the shield, and then press the locking member into the plane in which the two shanks 2, 3 are centered. The engagement of the rounded end 6b of the locking member with the particular side edge of the hood portion (the side edges of the hood portion are also rounded or curved, as shown) automatically effects, under the applied pressure, the essential axial movement of the locking member. The locking member snaps into place.

Having in mind the relatively small dimensions of the usual safety pin, it will be realized that the above described features, features that greatly facilitate the locking and unlocking of the pin, are of substantial practical value.

Within the terms and intent of the appended claims, many modifications in detail are held in contemplation.

I claim as my invention:

1. In a safety pin including two shanks united at one end for relative angular movement, one shank being pointed at its distal end, with the distal end of the second shank equipped with a shield adapted to receive and cover the pointed end of the first shank, and means for locking such pointed end in position in said shield; the invention herein described in which such means include a helical spring and a locking element that are mounted on said second shank, said locking element being movable both angularly and axially of said second shank, between a position in which said locking element under spring tension cooperates with said shield in securing said pointed end of the first shank, and a position in which said first shank may be moved relatively to the second shank and said pointed end removed from the shield, said locking element being anchored to said helical spring, and the turns of the spring being arranged in exposed position on said second shank and providing in effect a sleeve that may be taken between the thumb and finger of the user and turned and shifted on such shank, to operate said locking element, substantially as described.

2. In a safety pin including two shanks united at one end for relative angular movement, one shank being pointed at its distal end, with the distal end of the second shank equipped with a shield adapted to receive and cover the pointed end of the first shank, and means for locking such pointed end in position in said shield; the invention herein described in which such means include a locking element and a helical spring mounted on said second shank, said spring being anchored at one end to said locking element and at opposite end to the body of the pin, and said locking element under spring tension, being movable both angularly and axially of said second shank, between a position in which the locking element cooperates with said shield in securing said pointed end of the first shank, and a position in which said first shank may be moved relatively to the second shank and said pointed end removed from the shield, said spring being arranged to exert torsional stress on said locking element, with the effect that, when said locking element is moved axially of the pin shank from pin-locking position, said spring is effective to turn said locking element into release position.

3. In a fastening device including two members relatively movable between open and closed positions, one of said members comprising a shank provided with a pointed end, a shield portion carried by the other of such members and adapted to receive the pointed end of said shank, and means for locking such pointed end of the shank in position in said shield; the invention herein described in which such means include a locking member mounted on the shield-carrying member, and a spring arranged to exert its tension on said locking member, said spring being anchored at one end to said locking member and at opposite end to the body of the fastening device, said locking member, under spring tension, being both rotatable and movable longitudinally of the axis of rotation between a position, in which the pointed end of said shank is locked in said shield portion, and a position, in which the pointed end of the shank is released for removal from or entrance to said shield portion, said spring exerting rotative stress upon said locking member, with the effect that, when said locking member is moved longitudinally of said axis from position of cooperation with said shield, said spring turns the locking member into release position.

4. The structure of the next-preceding claim, in which said locking member is provided with a rounded end for cooperation with the body of said shield, substantially as described.

OSCAR THORESEN.